June 4, 1968  MASANORI NAGATSUKA  3,386,199
PHOTOGRAPH MOUNTING

Filed July 19, 1966  2 Sheets-Sheet 1

MASANORI NAGATSUKA
INVENTOR

BY Eliot Gerber
ATTORNEY

June 4, 1968  MASANORI NAGATSUKA  3,386,199
PHOTOGRAPH MOUNTING

Filed July 19, 1966  2 Sheets-Sheet 2

MASANORI NAGATSUKA
INVENTOR

BY Eliot Gerber
ATTORNEY

United States Patent Office 3,386,199
Patented June 4, 1968

3,386,199
PHOTOGRAPH MOUNTING
Masanori Nagatsuka, 54 3-chome, Aoyama, Minami-cho, Minato-ku, Tokyo, Japan
Filed July 19, 1966, Ser. No. 566,372
Claims priority, application Japan, July 28, 1965, 40/61,582; Sept. 3, 1965, 40/71,993
3 Claims. (Cl. 40—158)

ABSTRACT OF THE DISCLOSURE

A stiff cardboard sheet is used to mount photographs. The face of the cardboard sheet is covered with a metal foil having small cavities, which may make the foil cloth-like in appearance. The metal foil is covered with a pressure-sensitive adhesive and the adhesive is covered by a removable transparent film.

---

The present invention relates to the mounting of photographs and more particularly to an improved cardboard mounting for photographs.

The inexpensive mounting of photographs has always been a problem. An adequate mounting is obtained by placing them under glass in a conventional picture frame. However, this mounting system is expensive and is not suitable for an album. Alternatively, triangular shaped corners, each having a pocket and a glued back, may be used. These are inconvenient and often come loose. Photographs may also be adhered directly to cardboard by glueing their back side. This is also inconvenient and often, in time, the photograph curls and comes loose.

An improvement in the mounting of photographs has been a cardboard which has a pressure sensitive adhesive on its face. This cardboard is covered with a transparent sheet of plastic film. But this system also has its deficiencies. Often the adhesive on the cardboard sticks to the covering plastic film more strongly, particularly in some places, than it does to the cardboard backing. When the plastic film is attempted to be lifted, for insertion of a photograph, the adhesive comes with it. The cardboard may not have sufficient adhesive left to glue down the photograph and keep it flat.

Another drawback of this type of adhesive coated cardboard is that, particularly in warm climates, it becomes weakened and is easily torn.

It is the objective of the present invention to provide a relatively inexpensive means of preserving photographs in which they are kept flat and covered. Other objectives are that the mounting will not deteriorate with the passage of time, as many photographs are preserved for many years; that the mounting does not injure the photograph itself; that the mounting be convenient to use, unlike corners or liquid paste; and that the mounting does not deteriorate with age but is always ready for use.

Still another objective of the present invention is that the mounting means utilizes a small amount of the applied pressure-sensitive adhesive, which is comparatively high in cost.

A further objective of the present invention is to provide mounting means for photographs which is aesthetically pleasing to the eye and which enhances the mounted photograph.

A fuller understanding of the present invention and its objectives and features may be had from the following detailed description of a preferred embodiment with reference to the accompanying drawings, in which the similar parts are represented by the same reference numerals.

Figure 1:
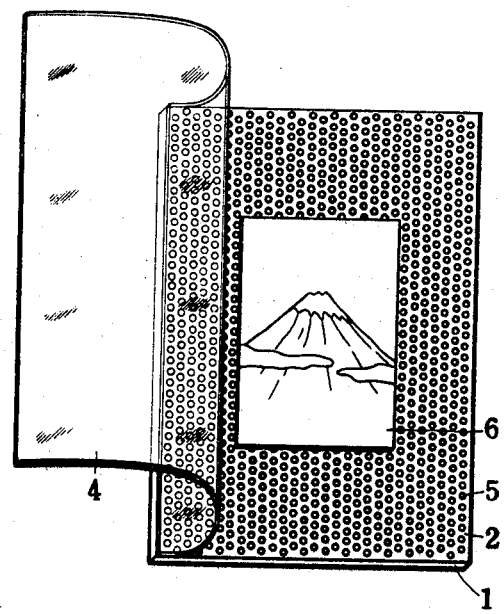
FIG. 1 is a perspective view of a cardboard mounting system according to the present invention, with the transparent film partly peeled off and a photograph pasted on the surface of the cardboard.
Figure 2:
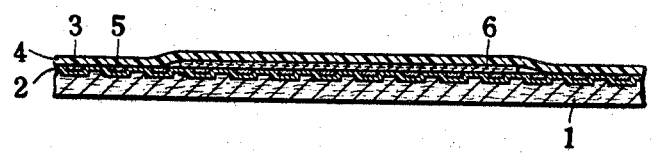
FIG. 2 is a vertically sectioned view of the first embodiment as shown in FIG. 1, in which the surface onto which the photograph is pasted is covered with the transparent film.

The first embodiment of the cardboard mounting a system for photographs is explained in connection with FIGS. 1 and 2. The system comprises a metallic foil 2 laminated on cardboard 1, a pressure-sensitive adhesive 3 painted onto the upper surface of said metallic foil 2 and a transparent plastic film (sheet) 4 removably covering the upper surface of the painted layer of said pressure-sensitive adhesive 3.

The metallic foil 2 is selected from those foils not having pinholes which are comparatively inexpensive. A preferred example is an aluminum foil. The metallic foil 2 positively divides and separates the cardboard 1 and the pressure-sensitive adhesive 3 from each other. The adhesive 3 with its volatile part is prevented from penetrating the cardboard 1 because of the presence of metallic foil 2. The adhesive cannot volatilize. Even if moisture happens to come in through the cardboard 1, it will be intercepted by the metallic foil 2 so as not to adversely affect the adhesive 3. When a photograph 6 is pressed and pasted on the pressure-sensitive adhesive 3, and the exposed surface of the adhesive and the upper surface of the pasted photograph are covered with the transparent film 4, the pressure-sensitive adhesive 3 is entirely isolated from the atmosphere. As a result, the composition of the pressure-sensitive adhesive 3 does not change over long periods and maintains proper adhesiveness to paste the photograph 6 at any time. The photograph 6, once it has been pasted down, can be peeled off later and another photograph can be pasted down in its place.

The transparent film 4 covers the entire upper surface of the pressure-sensitive adhesive 3 so as to protect it from the atmosphere. The film 3 also protects the photograph 6 from being stained with hand dirt or finger prints. Because of the metal foil 2, one need not fear in peeling off the film lest the cardboard be hurt. The film may be peeled off quickly.

The adhesive, because of the presence of the metal foil 2, does not penetrate the surface of the cardboard 1. Consequently, a comparatively small amount of adhesive is required, as none is lost into the cardboard. Because the cardboard 1 is covered with the laminated metallic foil 2, the cardboard may be comparatively cheap and of a low quality. The luster and color peculiar to the metallic foil 2 gives a unique appearance. It distinguishes the photograph 6 pasted on it and is effective to enhancing its value.

Figure 3:
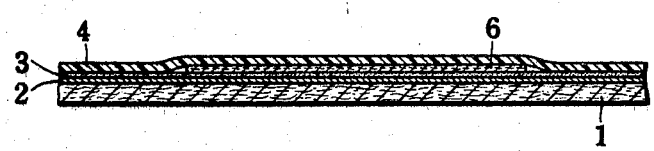
FIG. 3 is a vertically sectioned view of a second embodiment taken in the same manner as FIG. 2.

As shown in FIG. 3, the above-mentioned metallic foil 2 may be of a flat surface without irregularities. But, preferably as shown in FIGS. 1 and 2, many small cavities 5 (not holes) are made over the entire surface of the foil. When the metallic foil 2 is painted with the pressure-sensitive adhesive 3, the cavities 5 are filled with adhesive. The use of cavities aid in preventing the undesired atmospheric effects on the adhesive and the cardboard.

The pressure-sensitive adhesive is little changed in its composition over time and may be stored. The resistance to peeling off the transparent film 4 is lower, when cavities are used, than in the case of the flat surface and the film may be easily peeled off with a small force.

Figure 4:
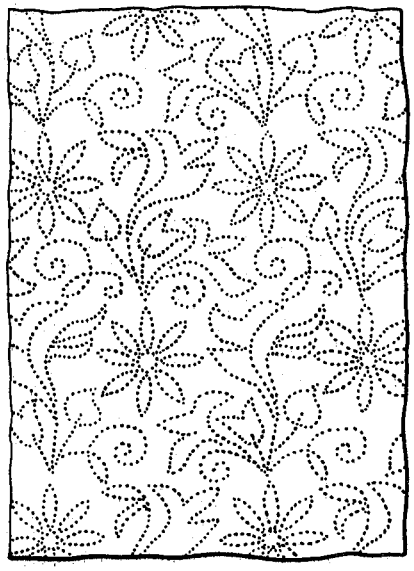
FIG. 4 is a top plan view showing an example of a pattern formed with fine cavities on a metallic foil.

Such small cavities 5 can be formed by such known conventional methods as, for example, by pressing the foil with an embossing roller so as to leave pressed traces. The cavities 5 may be in the form of dots, lines or designs. An example of a decorative pattern formed of the many cavities 5 is shown in FIG. 4. Alternatively, foil may be embossed with a pattern so that it has a cloth-like appearance. When such a cloth-like pattern is arranged in parallel with the edge side of the cardboard, it provides a standard for correctly pasting the photograph 6 without inclining the photograph. Some kinds of metallic foil may show a rather shiny luster. But, when the cavities 5 are made over its entire surface, it has the effect of reducing or eliminating such shiny luster.

Only preferable embodiments of the present invention have been described above. But, even if various changes or modifications are made within the scope of the accompanying claims, they will not deviate from the subject matter of the present invention. For example, the product of the present invention, when cut in a proper size, can be utilized as a pleasing, inexpensive frame requiring no glass, or several of them may be overlapped and utilized as an album.

What is claimed is:
1. A system for the mounting of photographs comprising a stiff cardboard backing sheet, a metal foil laminated to said cardboard sheet, a pressure-sensitive adhesive coated on the upper surface of said metal foil, and a transparent film removably covering said adhesive coating, wherein the metal foil has impressed on it a large multitude of small cavities.

2. The system of claim 1 wherein the cavities form a decorative pattern.

3. The system of claim 2 wherein the pattern is cloth-like in appearance.

References Cited
UNITED STATES PATENTS

| | | | |
|---|---|---|---|
| 2,283,026 | 5/1942 | Yates | 129—20 |
| 2,768,460 | 10/1956 | Northrup | 40—135 |
| 2,914,873 | 12/1959 | Brennan | 40—125 |

EUGENE R. CAPOZIO, *Primary Examiner.*

W. J. CONTRERAS, *Assistant Examiner.*